(12) United States Patent
Brownholtz et al.

(10) Patent No.: US 10,650,062 B2
(45) Date of Patent: May 12, 2020

(54) ACTIVITY CENTRIC RESOURCE RECOMMENDATIONS IN A COMPUTING ENVIRONMENT

(75) Inventors: Elizabeth A. Brownholtz, Andover, MA (US); Casey Dugan, Medford, MA (US); Werner Geyer, Boston, MA (US); Michael Muller, Medford, MA (US); Jianqiang Shen, Corvallis, OR (US)

(73) Assignee: International Business Machines Corporation, Armonk, NY (US)

( * ) Notice: Subject to any disclaimer, the term of this patent is extended or adjusted under 35 U.S.C. 154(b) by 1870 days.

(21) Appl. No.: 11/967,637

(22) Filed: Dec. 31, 2007

(65) Prior Publication Data

US 2009/0172573 A1 Jul. 2, 2009

(51) Int. Cl.
*G06F 16/95* (2019.01)
*G06F 9/48* (2006.01)

(52) U.S. Cl.
CPC .............. *G06F 16/95* (2019.01); *G06F 9/485* (2013.01)

(58) Field of Classification Search
CPC ................................. G06F 17/30861
USPC ................. 715/744, 764, 853, 745
See application file for complete search history.

(56) References Cited

U.S. PATENT DOCUMENTS

| | | | | |
|---|---|---|---|---|
| 5,452,416 | A * | 9/1995 | Hilton et al. | 715/783 |
| 6,184,883 | B1 * | 2/2001 | Bates et al. | 715/794 |
| 6,195,657 | B1 | 2/2001 | Rucker et al. | |
| 6,340,977 | B1 * | 1/2002 | Lui | G06F 9/4446 715/706 |
| 6,975,613 | B1 * | 12/2005 | Johansson | 370/338 |
| 7,047,498 | B2 * | 5/2006 | Lui | G06F 9/4446 715/709 |
| 7,069,220 | B2 * | 6/2006 | Coffman | G10L 15/26 704/270 |
| 7,428,528 | B1 * | 9/2008 | Ferrari et al. | |
| 7,496,575 | B2 * | 2/2009 | Buccella | G06F 21/552 |
| 7,716,649 | B2 * | 5/2010 | Clemm et al. | 717/128 |
| 7,861,178 | B2 * | 12/2010 | Lui | G06F 9/4446 715/708 |

(Continued)

FOREIGN PATENT DOCUMENTS

EP 1335306 A3 * 8/2003 ....... G06F 17/30861

OTHER PUBLICATIONS

Chapter_1_probability_1_9_Bayes_theorem, Jul. 23, 1997, Princeton.*

(Continued)

*Primary Examiner* — Cesar B Paula
*Assistant Examiner* — John M Heffington
(74) *Attorney, Agent, or Firm* — Steven M. Greenberg, Esq.; Shutts & Bowen LLP

(57) ABSTRACT

Embodiments of the present invention address deficiencies of the art in respect to context sensitive resource recommendations and provide a method, system and computer program product for activity sensitive context sensitive resource recommendations. In an embodiment of the invention, an activity-centric resource recommendation method can be provided. The method can include inferring an activity from a workspace in a graphical user interface, identifying resources from amongst a set of resources that are relevant to the inferred activity, and displaying the identified resources in the graphical user interface.

15 Claims, 1 Drawing Sheet

(56) References Cited

U.S. PATENT DOCUMENTS

| | | | |
|---|---|---|---|
| 2003/0067554 A1* | 4/2003 | Klarfeld | G11B 27/105 348/461 |
| 2005/0033712 A1* | 2/2005 | D'Ambrosio | 706/52 |
| 2005/0197784 A1* | 9/2005 | Kincaid et al. | 702/19 |
| 2006/0107219 A1* | 5/2006 | Ahya et al. | 715/745 |
| 2006/0168550 A1* | 7/2006 | Muller et al. | 715/866 |
| 2006/0242651 A1* | 10/2006 | Zielinski et al. | 719/318 |
| 2006/0277168 A1 | 12/2006 | Hammond et al. | |
| 2007/0050719 A1* | 3/2007 | Lui | G06F 9/4446 715/762 |
| 2007/0060109 A1* | 3/2007 | Ramer et al. | 455/414.1 |
| 2007/0083506 A1* | 4/2007 | Liddell et al. | 707/5 |
| 2007/0156723 A1* | 7/2007 | Vaananen | G06F 3/0485 |
| 2007/0168885 A1* | 7/2007 | Muller et al. | 715/853 |
| 2007/0300179 A1* | 12/2007 | Friedlander | 715/781 |
| 2007/0300185 A1* | 12/2007 | Macbeth et al. | 715/825 |
| 2008/0034293 A1* | 2/2008 | Vaananen | G06F 3/0485 715/700 |
| 2008/0104542 A1* | 5/2008 | Cohen | G06F 17/30864 715/810 |
| 2008/0130543 A1* | 6/2008 | Singh et al. | 370/311 |
| 2008/0177726 A1* | 7/2008 | Forbes et al. | 707/5 |
| 2008/0270450 A1* | 10/2008 | Veitch et al. | 707/102 |
| 2009/0100137 A1* | 4/2009 | Venkitaraman | H04L 67/104 709/205 |

OTHER PUBLICATIONS

Bing search q=deduce%20activity%20gui&qs=n&form= Apr. 13, 2016.*
Bing search q=infer+activity+gui&src=IE-SearchBo Apr. 13, 2016.*
Microsoft Inductive User Interface Guidelines Feb. 9, 2001.*

* cited by examiner

ACTIVITY CENTRIC RESOURCE RECOMMENDATIONS IN A COMPUTING ENVIRONMENT

BACKGROUND OF THE INVENTION

Field of the Invention

The present invention relates to automated content discovery and search engine use in a computer communications network and more particularly to context-sensitive resource recommendation.

Description of the Related Art

The explosion of content due to the widespread use of the global Internet has created powerfully important industries centered on content searching and retrieval. The amount of information now available through the portal of the personal computer can be so voluminous as to be unmanageable. Search engines attempt to index content so as to provide a user simplistic interface to locate content of relevance, however, search results for even the most conservative of queries can be large data sets ill suited for analysis by the average user.

Search engines generally require the express formulation of a search query by an end user. However, in the context of complex work practices oftentimes, it can be helpful to proactively discover content without expressly keying a search query. To that end, context-sensitive resource recommendation technologies associate content in an end user computing environment with an index of content in order to proactively suggest hyperlinks to relevant content. Likewise, other context-sensitive resource recommendation technologies discover available keywords for environmental conditions like window titles in a graphical user interface to compare to an index of content in order to proactively suggest hyperlinks to relevant content.

These context-sensitive resource recommendation technologies, however, rely upon word similarities in that these technologies construct an input query and compare the input query with candidate resources. While this type of context-sensitive search can save valuable time because users are not required to express a search query directly with a search engine, this type of context sensitive search still uses the same information retrieval technique as the standard search engine. Rather, the process of searching just becomes automated.

To be specific, traditional approaches adopt an information retrieval technique as follows. First, query and candidate resources are converted into pattern vectors based on a semantic analysis or merely a keyword analysis. Second, the similarity between the pattern of the query and the pattern of the resource is compared and resources with high similarities are recommended. In consequence, the sensed keywords, such as those from window title bars, do not necessarily reflect accurately what a user is looking for. Further, ranking search results from different data sources can be difficult just as is the case with a traditional search engines.

BRIEF SUMMARY OF THE INVENTION

Embodiments of the present invention address deficiencies of the art in respect to context sensitive resource recommendations and provide a novel and non-obvious method, system and computer program product for activity sensitive context sensitive resource recommendations. In an embodiment of the invention, an activity-centric resource recommendation method can be provided. The method can include inferring an activity from a workspace in a graphical user interface, identifying resources from amongst a set of resources that are relevant to the inferred activity, and displaying the identified resources in the graphical user interface.

In an aspect of the embodiment, inferring an activity from a workspace in a graphical user interface can include training a Bayesian predictor with words known to appear in connection with different activities, monitoring active windows in the workspace to extract window titles from the active windows and to place the window titles in a finite queue, and providing the titles in the finite queue to the Bayesian predictor to compute a probability set of activities for the window titles. Further, in other aspects of the embodiment, training a Bayesian predictor with words known to appear in connection with different activities, can include either or both of employing a stopword list to filter out common words amongst the words known to appear in connection with different activities and stemming the common words amongst the words known to appear in connection with different activities.

In yet another aspect of the embodiment, inferring an activity from a workspace in a graphical user interface can include training a predictor and applying the predictor through Support Vector Machines (SVM). Further, common words can be filtered out of the corpus of the predictor through semantic look-ups such as those in an online dictionary to identify articles and other word-types that typically do not contribute specific meaning to a context. Finally, prior statistical co-occurrence analysis can be used to determine frequently co-occurring words in order to identify potential synonyms thereby in order to reduce the corpus of words in the predictor.

In another embodiment of the invention, a resource recommendation data processing system can be provided. The system can include a Bayesian predictor executing in a host computing platform and coupled to a workspace of a graphical user interface provided by the host computing platform. The predictor can be trained with a bag of words associated with different activities performed through the host computing platform. The system further can include resource recommendation logic also executing in the host computing platform. The logic can include program code enabled to infer an activity from the workspace using the titles extracted from windows in the workspace and the Bayesian predictor, to identify resources from amongst a set of resources that are relevant to the inferred activity, and to display the identified resources in the graphical user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the present invention provide a method, system and computer program product for activity sensitive context sensitive resource recommendations. In accordance with an embodiment of the present invention, an activity can be inferred through contextual data in a graphical user interface. For instance, a Bayesian predictor trained with a set of words associated with different activities can compute the probability of an activity based upon an observation of meta-data extracted from graphical user interface elements in a workspace in the graphical user interface. Once the activity has been inferred, the content of the activity can be compared to a set of resources in order to filter the set of the resources to estimated resources of relevance. The resources of relevance in turn can be ranked according to the probability that a given one of the filtered resources is relevant to the activity.

Figure 1:
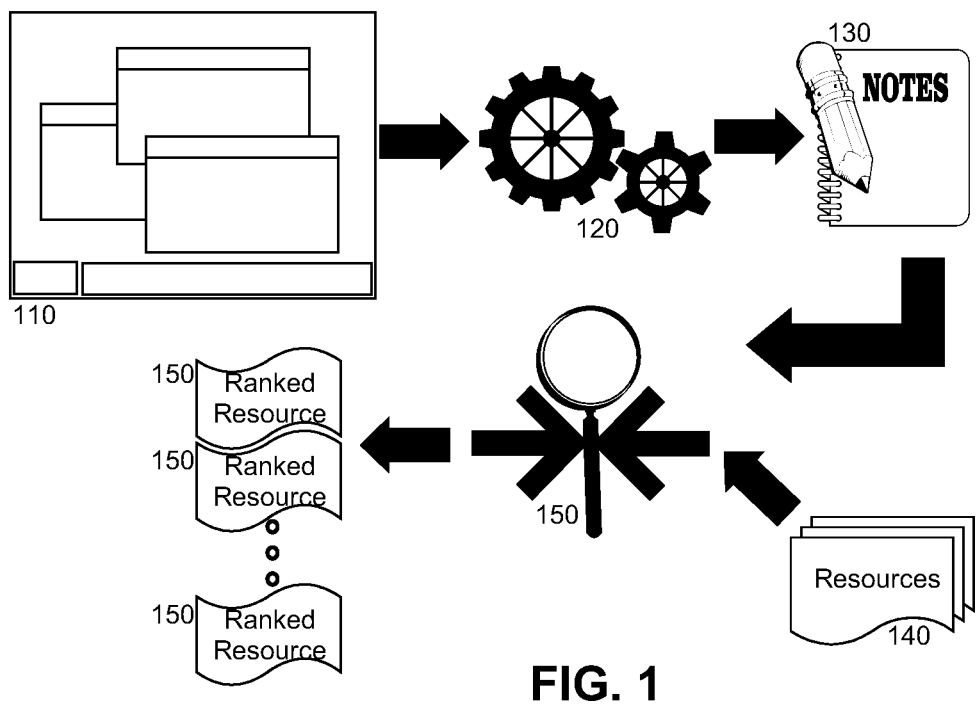
- FIG. 1 is a pictorial illustration of a process for activity sensitive context sensitive resource recommendations.

In further illustration, FIG. 1 pictorially depicts a process for activity sensitive context sensitive resource recommendations. As shown in FIG. 1, a workspace 110 in a graphical user interface of a computing environment can include multiple different windows and respective controls, each including meta-data such as an internal description, a handle in the graphical user interface, a title and the like. The workspace 110 can be monitored and the meta-data associated with the workspace as monitored can be provided as input to a Bayesian predictor 120 to infer a current activity 130.

Both the current activity 130 and a set of resources 140 can be provided as input to a resource relevance engine 150 as part of the Bayesian predictor 120. The resource relevance engine 150 can compute a weighted relevance of each of the resources 140 in respect to the inferred activity 130 by applying a Bayesian model for all possible activities inferred by the monitored workspace 110. Thereafter, those of the resources 140 found to be relevant can be listed in rank order as a set of ranked resources 150. In this way, a set of ranked resources 150 can be provided proactively based upon an inferred activity through the use of the workspace 110 by the end user.

Figure 2:
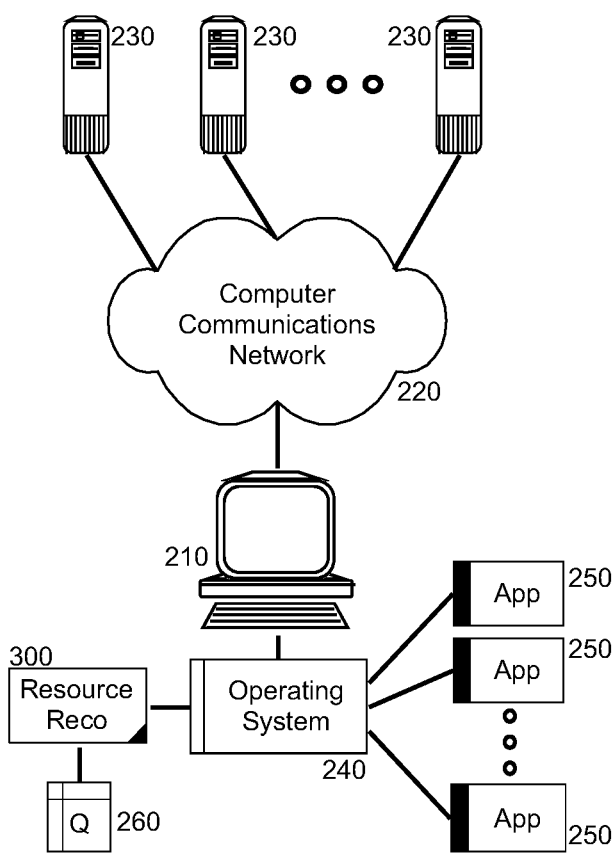
FIG. 2 is a schematic illustration of a computer data processing system configured for activity sensitive context sensitive resource recommendations; and, FIG. 3 is a flow chart illustrating a process for activity sensitive context sensitive resource recommendations.

In further illustration, FIG. 2 is a schematic illustration of a computer data processing system configured for activity sensitive context sensitive resource recommendations. The system can include a host computing platform 210 configured for communicative coupling to multiple different resource sources 230 over computer communications network 220. The host computing platform 210 can support the operation of an operating system 240 and the operating system, in turn, can manage the execution of one or more applications 250. Moreover, the operating system can provide a workspace within a graphical user interface in which multiple different windows and other user interface controls can co-exist in support of the execution of the applications 250.

Resource recommendation logic 300 can be coupled to the operating system 240. The resource recommendation logic 300 can include program code enabled to infer a current activity based upon the title of each window displayed in the workspace of the operating system 240. In this regard, once a window has been displayed as the active window for longer than a threshold period of time, the program code of the logic 300 can insert the title of the active window into a queue 260 whilst the oldest title in the queue 260 can be removed. Subsequently, the program code of the logic 300 can compare all of the words in each title in the queue 260 to a Bayesian predictor in order to compute a probability P(y|x) that the observation x of the workspace of the operating system 240 as expressed by the titles in the queue 260 belongs to a specific activity y.

Once the Bayesian predictor has inferred the activity, the program code of the logic 300 can compute and weight one or more relevant resources for the specific activity according to a Bayesian model. Specifically, the weighted relevance, also referred to as the "expected relevance" can be computed as $$R_c(x) = \sum_y P(y\mid c)\cdot R_y(x) = \sum_y P(y\mid c)\cdot P(y\mid x)$$

where R is the relevance and y is the activity and c is the queue 260. In consequence of the expected relevance, even though an activity may not be known with certainty, the most relevant resources to each possible activity will be viewed as highly relevant. Conversely, when an activity is known with some degree of certainty, the resources relevant to other activities still can be noticeable if there is a probability that the other activities are the current activity.

Figure 3:
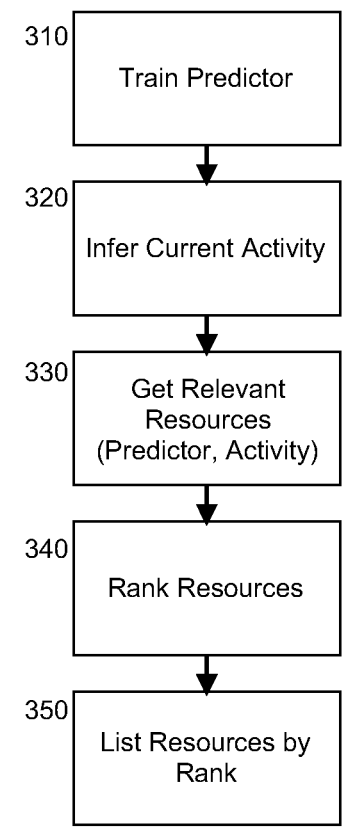

In yet further illustration, FIG. 3 is a flow chart illustrating a process for activity sensitive context sensitive resource recommendations. Beginning in block 310, a Bayesian predictor can be trained to infer an activity from the context of meta-data for workspace controls in a graphical user interface. Specifically, possible words in an activity centric computing environment can be accumulated including window titles and other graphical user interface control meta-data. The accumulated words can be compiled into a "bag of words" in order to remove any relevance associated with the placement of the words in a particular window or control. A stop word list further can be applied to the bag of words to filter out common words such as the names of commonly known computing applications like Web browsers and word processors, and commonly used terms in messages such as "Re:" and "Fw:" Finally, the words in the bag of words can be stemmed into roots, for example the words "computing", "computable" and "computer" can be stemmed to "compute". Finally, the remaining words can be used to train the Bayesian predictor.

In block 320, a current activity can be inferred. For example, in one aspect of the embodiment, each window in the workspace having been active for a threshold period of time can be observed and its respective title inserted into a queue. The queue can be of finite size and managed according to list-in first-out (LIFO). At any given time, a current activity can be inferred by feeding the titles in the queue to the Bayesian predictor. The Bayesian predictor in turn can produce a probability set of activities. Thereafter, in block 330 relevant resources can be determined with the Bayesian predictor by applying both a set of available resources and the probability set of activities to the Bayesian predictor resulting in a weighted set of relevant resources. In block 340, the weighted set of relevant resources can be placed in rank order and in block 350 the weighted set of relevant resources can be displayed for use in the workspace of the graphical user interface.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An activity-centric resource recommendation method comprising:
retrieving into memory of a computer contextual data provided by different graphical user interface elements disposed within a workspace in a graphical user interface;
inferring an activity based upon deduction from the retrieved contextual data provided by different graphical user interface elements disposed within the workspace in the graphical user interface by training a Bayesian predictor with words known to appear in connection with different activities, monitoring active windows in the workspace to extract window titles from the active windows and to place the window titles in a finite queue and providing the titles in the finite queue to the Bayesian predictor to compute a probability set of activities for the window titles;
identifying resources from amongst a set of resources that are relevant to the inferred activity; and,
displaying the identified resources in the graphical user interface.

2. The method of claim 1, wherein training a Bayesian predictor with words known to appear in connection with different activities, further comprises employing a stopword list to filter out common words amongst the words known to appear in connection with different activities.

3. The method of claim 1, wherein training a Bayesian predictor with words known to appear in connection with different activities, further comprises employing semantic analysis to filter out common words amongst the words known to appear in connection with different activities.

4. The method of claim 1, wherein training a Bayesian predictor with words known to appear in connection with different activities, further comprises stemming the common words amongst the words known to appear in connection with different activities.

5. The method of claim 1, wherein training a Bayesian predictor with words known to appear in connection with different activities, further comprises using statistical co-occurrence analysis to identify synonyms amongst the words known to appear in connection with different activities.

6. The method of claim 1, wherein monitoring active windows in the workspace to extract window titles from the active windows and to place the window titles in a finite queue, comprises monitoring active windows in the workspace to extract window titles from only active windows that have been active for more than a threshold period of time and to place the window titles in a finite queue.

7. The method of claim 1, wherein identifying resources from amongst a set of resources that are relevant to the inferred activity, comprises computing an expected relevance of a resource x as $$R_c(x) = \sum_y P(y \mid c) \cdot R_y(x) = \sum_y P(y \mid c) \cdot P(y \mid x)$$

where R is the expected relevance and y is the inferred activity and c is the queue.

8. A resource recommendation data processing system comprising:
a host computing platform comprising at least one computer with memory and at least one processor;
a Bayesian predictor executing in the memory of the host computing platform, coupled to a workspace of a graphical user interface provided by a processor of the host computing platform, and trained with a bag of words associated with different activities performed through the host computing platform; and,
resource recommendation logic also executing in the host computing platform, the logic comprising program code enabled to retrieve into memory of the host computing platform contextual data provided by different graphical user interface elements disposed within a workspace in a graphical user interface, to infer an activity based upon deduction from the retrieved contextual data provided by different graphical user interface elements disposed within workspace in the graphical user interface using the titles extracted from windows in the workspace and the Bayesian predictor by monitoring active windows in the workspace to extract window titles from the active windows and to place the window titles in a finite queue and providing the titles in the finite queue to the Bayesian predictor to compute a probability set of activities for the window titles, to identify resources from amongst a set of resources that are relevant to the inferred activity, and to display the identified resources in the graphical user interface.

9. A computer program product comprising a computer usable storage device that medium stores thereon computer usable program code for activity-centric resource recommendation, the computer program product comprising:

computer usable program code for retrieving contextual data provided by different graphical user interface elements disposed within a workspace in a graphical user interface;

computer usable program code for inferring an activity based upon deduction from the retrieved contextual data provided by different graphical user interface elements disposed within the workspace in the graphical user interface by training a Bayesian predictor with words known to appear in connection with different activities, monitoring active windows in the workspace to extract window titles from the active windows and to place the window titles in a finite queue and providing the titles in the finite queue to the Bayesian predictor to compute a probability set of activities for the window titles;

computer usable program code for identifying resources from amongst a set of resources that are relevant to the inferred activity; and, computer usable program code for displaying the identified resources in the graphical user interface.

10. The computer program product of claim 9, wherein the computer usable program code for training a Bayesian predictor with words known to appear in connection with different activities, further comprises computer usable program code for employing a stopword list to filter out common words amongst the words known to appear in connection with different activities.

11. The computer program product of claim 9, wherein the computer usable program code for training a Bayesian predictor with words known to appear in connection with different activities, further comprises computer usable program code for employing semantic analysis to filter out common words amongst the words known to appear in connection with different activities.

12. The computer program product of claim 9, wherein the computer usable program code for training a Bayesian predictor with words known to appear in connection with different activities, further comprises computer usable program code for stemming the common words amongst the words known to appear in connection with different activities.

13. The computer program product of claim 9, wherein the computer usable program code for training a Bayesian predictor with words known to appear in connection with different activities, further comprises using computer usable program code for statistical co-occurrence analysis to identify synonyms amongst the words known to appear in connection with different activities.

14. The computer program product of claim 9, wherein the computer usable program code for monitoring active windows in the workspace to extract window titles from the active windows and to place the window titles in a finite queue, comprises computer usable program code for monitoring active windows in the workspace to extract window titles from only active windows that have been active for more than a threshold period of time and to place the window titles in a finite queue.

15. The computer program product of claim 9, wherein the computer usable program code for identifying resources from amongst a set of resources that are relevant to the inferred activity, comprises computer usable program code for computing an expected relevance of a resource x as $$R_c(x) = \sum_y P(y \mid c) \cdot R_y(x) = \sum_y P(y \mid c) \cdot P(y \mid x)$$

where R is the expected relevance and y is the inferred activity and c is the queue.

* * * * *